United States Patent [19]

Ironside

[11] 4,328,775
[45] May 11, 1982

[54] CLOSED LOOP CONTROL OF I.C. ENGINE IDLING SPEED

[75] Inventor: John M. Ironside, Birmingham, England

[73] Assignee: Lucas Industries Limited, Birmingham, Great Britain

[21] Appl. No.: 228,044

[22] Filed: Jan. 26, 1981

[30] Foreign Application Priority Data

Jan. 30, 1980 [GB] United Kingdom ............... 803132

[51] Int. Cl.³ .................... F02P 5/04; F02D 11/10
[52] U.S. Cl. .................................. 123/339; 123/418
[58] Field of Search .......................... 123/339, 418

[56] References Cited

U.S. PATENT DOCUMENTS

| | | | |
|---|---|---|---|
| 3,661,131 | 5/1972 | Croft | 123/339 |
| 4,111,174 | 9/1978 | Fitzner | 123/339 |
| 4,203,395 | 5/1980 | Cromas | 123/339 |

Primary Examiner—Ronald B. Cox
Attorney, Agent, or Firm—Ladas & Parry

[57] ABSTRACT

A closed loop idling control for an i.c. engine includes a difference signal generator which produces an engine speed error signal. This signals directly controls the ignition timing to provide a fast loop control of speed, but also controls the throttle position via an integrator to provide a slow loop which cancels out the error with minimum exhaust contamination.

5 Claims, 19 Drawing Figures

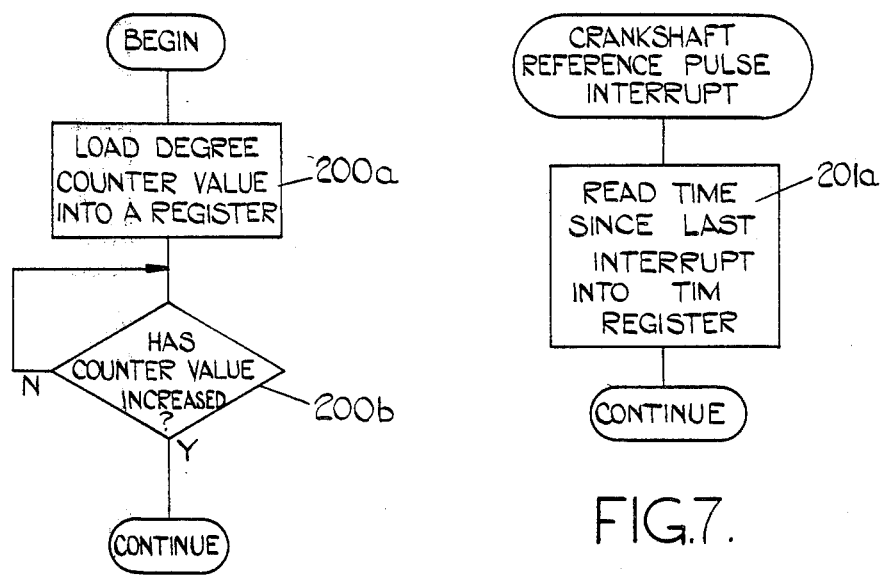
FIG.6.
FIG.7.
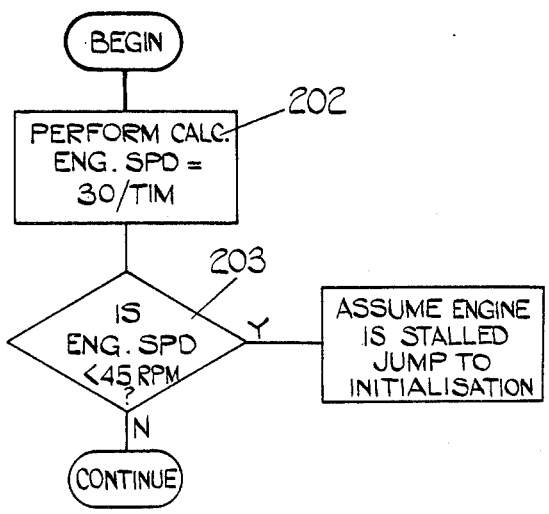
FIG.8.

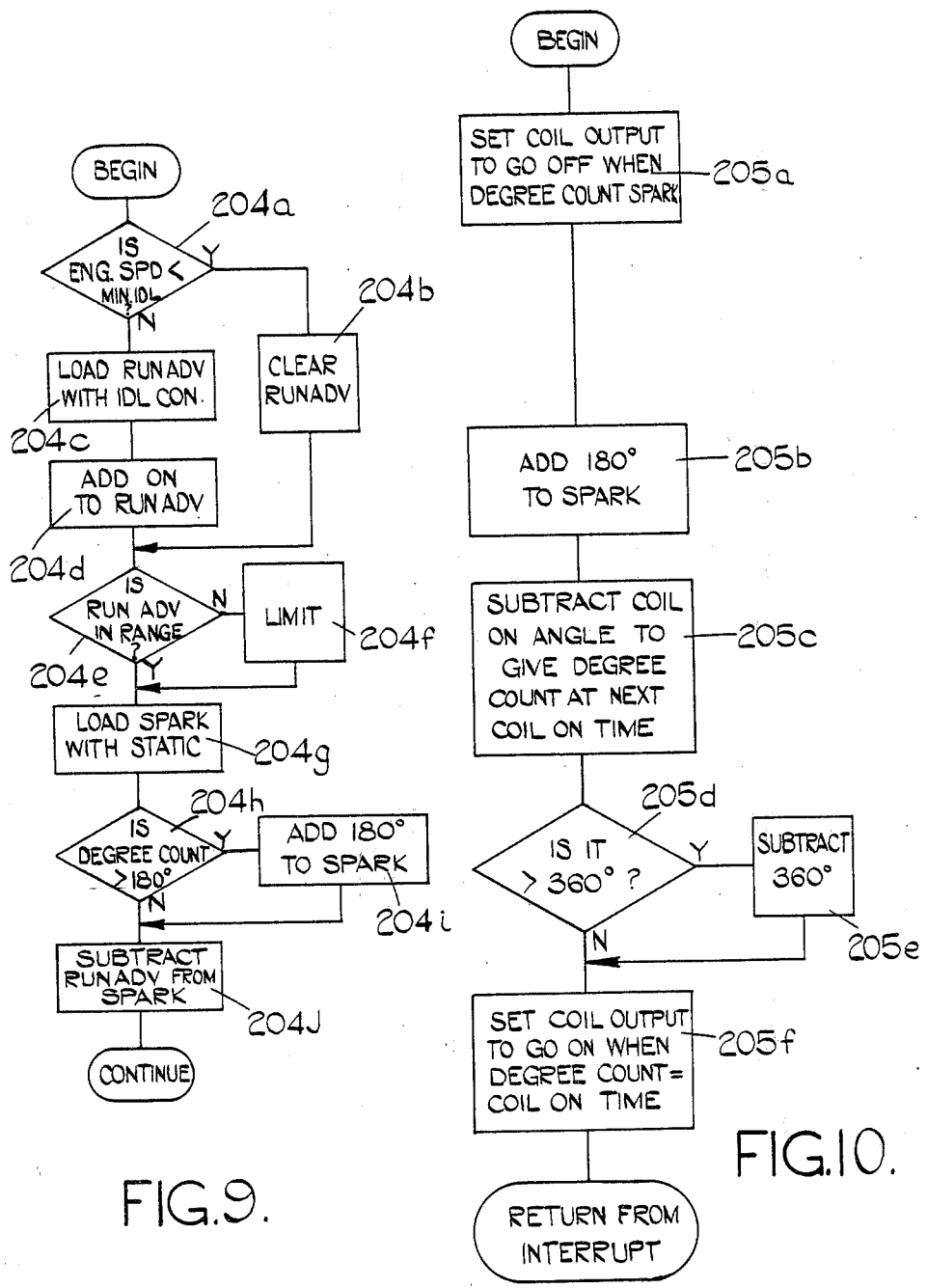

CLOSED LOOP CONTROL OF I.C. ENGINE IDLING SPEED

This invention relates to the closed loop control of internal combustion engine idling speed.

It has already been proposed to effect a closed loop idling speed control by mechanically adjusting the throttle butterfly valve or an auxiliary valve controlling air admission into the engine air intake manifold in accordance with the error between the actual engine speed and a demanded idling speed (both represented by electrical signals). With this arrangement, however, difficulties arise because of the relatively long delay which occurs between an adjustment being made and the resultant change in engine speed as a result of manifold and engine dynamics. This delay gives rise to stability problems.

Another prior proposal for closed loop idling speed control employs the error signal to control ignition timing. This overcomes the delay problem, because at the time when an ignition timing correction is made, the air and fuel for the current and next cycle of operation of the engine have already passed beyond the throttle butterfly. However, control of idling speed by ignition timing gives rise to fuel wastage and excessive noxious exhaust emissions during idling.

The present invention resides in the appreciation that the problems of the prior proposals can be solved by utilizing both ignition timing adjustment and air intake adjustment, the former being adjusted in accordance with the speed error and the latter in accordance with the time integral of the speed error. With such an arrangement the immediate effect of a change in the engine speed (resulting from a change in the load on the engine) will be an adjustment of the ignition timing, which will reduce, but not eliminate, the speed error. The air intake adjustment will take place more slowly as the magnitude of the time integral of the error increases until the error becomes zero, by which time the ignition adjustment will have been removed. Thus the excessive fuel consumption and exhaust emissions will only occur as a transient condition, which is perfectly acceptable.

In accordance with the invention, therefore, an internal combustion engine closed loop idling control system comprises circuit means for generating an electrical signal representing the error between the engine speed and a desired idling speed, ignition timing control means connected to be controlled by said error signal so as to vary the engine ignition timing in accordance with said error signal and air admission control means connected to be controlled in accordance with the time integral of the error signal for controlling air flow into the engine air intake manifold.

The invention also resides in a method of controlling the idling speed of an internal combustion engine which comprises generating an electrical signal representing the error between the actual engine speed and a desired idling speed, controlling the ignition timing of the engine directly in accordance with the error signal in a manner to cause the engine speed to approach the desired idling speed and controlling the admission of air or air/fuel mixture to the engine in accordance with the time integral of the error signal in a manner to cause the engine speed to approach the desired idling speed.

In the accompanying drawings.

Figure 1:
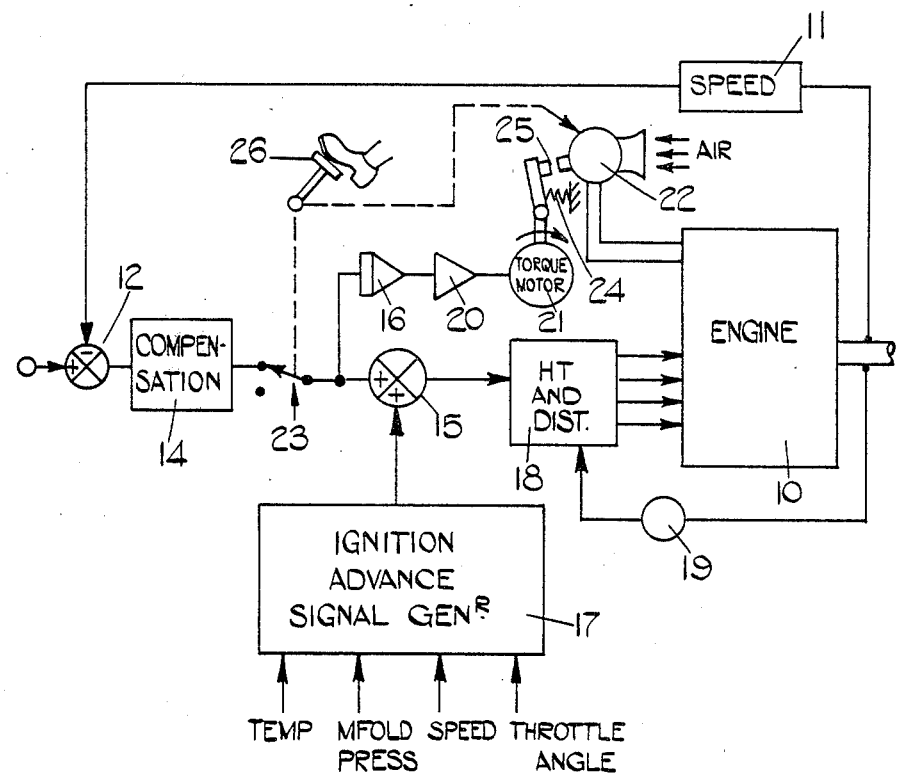
FIG. 1 is a block diagram of one example of an idling control system in accordance with the invention.

In the example shown in FIG. 1 the engine 10 drives a speed transducer 11 which supplies a speed signal to a difference amplifier 12 which also receives a signal from a demand signal generator 13 which is preset to produce a signal corresponding to the value of the signal from the transducer 11 when the engine is running at the desired engine speed. The difference amplifier 12 produces an output signal which is proportional to the error between the actual and desired engine speeds.

The error signal is applied via a stabilising phase compensation circuit 14 and a switch 23 to a summing amplifier 15 and also to an integrator 16. The summing amplifier 15 has a second input from an ignition advance signal generating circuit 17 which receives inputs corresponding to various engine operating parameters, such as coolant temperature, manifold pressure, engine speed, and throttle angle and produces an output signal representing the required ignition advance angle. This output signal is fed via the summing amplifier 15 to an ignition circuit 18 which receives timing signals from a crankshaft position transducer 19 and triggers sparks at the required instants in well known manner.

When the switch 23 is closed, the effect of applying the phase compensated error signal to the circuit 18 in addition to the output signal from the circuit 17 by way of the summing amplifier 15, is to vary the ignition timing for a given set of values of the parameters to which the circuit 17 is sensitive, in accordance with the magnitude and polarity of the error between desired and actual engine speeds. When the actual speed is too high the effect of the error signal is to retard the ignition and when it is too slow the effect is to advance the ignition, thereby providing a rapid reduction of the speed error. Such corrective action will, however, result in fuel wastage and excessively polluted exhaust emissions, because the quantity of fuel-air mixture admitted to the engine is not being altered. The control of the ignition by the amplifier 12 has only limited authority i.e. it can change the ignition timing relatively little and only when the switch 23 is closed.

The integrator 16 provides an output which is proportional to the time integral of the phase compensated error signal and this integral signal is applied via a power amplifier 20 to a motor 21 which operates an air flow control valve 22 controlling air admission to the engine. The valve 22 may be either the normal throttle butterfly or a separate air by-pass valve and control of the valve is effected in a well known manner. In the example shown in FIG. 1 the motor 21 is a torque motor which operates against a rate spring 24 and controls the idling position of the actual throttle valve by moving an idling stop 25 against which the throttle valve is urged by its spring loading when the driver's throttle pedal 26 is released.

When engine speed is too high, the error signal will be negative and this negative error signal will be integrated by the integrator 16 and the resulting output will cause the valve 22 to be moved in a closing direction to limit the air flow into the engine.

The combined effect of the two speed control branches will be as follows: during idling if the engine speed starts to increase because of the removal of a load from the engine, the error signal from amplifier 12 will increase in magnitude until the resulting corrective action by retarding of the spark brings about an equilibrium condition in which a certain small error signal will be maintained. This condition is achieved quickly because of the rapid reaction of the engine to changes in the ignition timing. Meanwhile, the output of the integrator 16 changes relatively slowly causing the valve 22 to be adjusted slowly to reduce air flow into the engine. As the air-flow reduces, the amount of ignition correction required reduces, until an equiibrium condition is finally reached in which the output of amplifier 12 is zero, so that no ignition adjustment is occurring, the output of the integrator being at such a level as to hold the valve in the position necessary to maintain the engine speed at its desired level without any ignition correction.

The idling speed of the engine is thus controlled in a simple manner without any problems being caused by delays in the effect of air flow changes and with pollution and fuel wastage being reduced to transient conditions only.

In the example shown in FIG. 1 the switch 23 is operatively connected to the throttle pedal 26 so as to be closed only when the pedal is in its idling position. There is preferably some lost motion in the linkage (not shown) connecting the throttle pedal 26 to the throttle valve so that on depression of the pedal the switch 23 opens before the throttle valve moves away from the idling stop. The switch 23 serves to prevent the error signal from amplifier 12 from having any effect on the ignition timing during normal running of the engine and also causes the integrator 16 output to remain constant except during idling.

The switch 23 may alternatively be operated by detecting the position of the throttle valve relative to the stop. Where a throttle by-pass valve is used, rather than a movable idling stop, the switch 23 may be arranged to detect movement of the butterfly valve away from its fixed (but probably adjustable) stop.

Although the switch 23 is shown as a mechanically operated contact in FIG. 1, it will be appreciated that it may be replaced by an electronic switch operable by means of a suitable electronic position detector.

Figure 2:
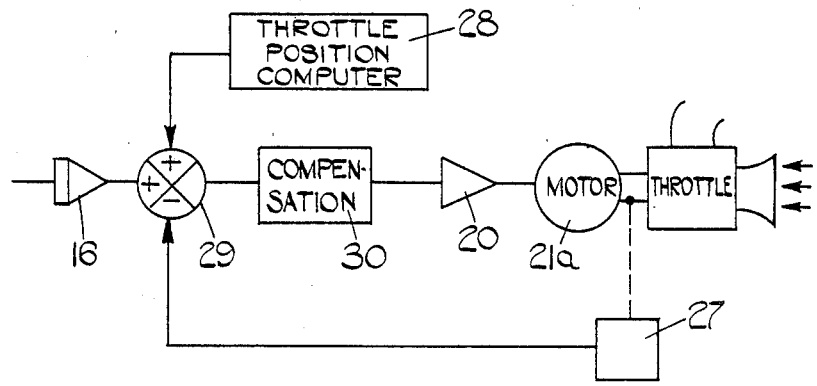
FIG. 2 is a block diagram of a modification to FIG. 1.

In the example shown in FIG. 2 the motor 21a is not a torque motor but an ordinary d.c. rotary motor which drives the actual throttle valve through a reduction gear arrangement (not shown). A throttle valve position transducer 27 is connected to the throttle valve and provides a d.c. feedback signal to permit closed loop control of the motor 21a by the integrator 16 during idling. The output of the integrator 16 is combined with that of a throttle position computer 28 (which does not form any part of the present invention) which is provided to produce a throttle position demand signal varying in accordance with several engine operating parameters such as engine speed, wheel speed, and throttle pedal position. A summing amplifier 29 receives this demand signal and the signals from the integrator 16 and the transducer 27 and generates an output corresponding to the difference between the signal from the transducer 27 and the sum of the signals from the computer 28 and from the integrator 16.

The output of amplifier 29 is applied via a further phase compensation circuit 30 to the power amplifier 20 which controls current flow to the motor 21a.

During idling the demand signal from the computer 28 will correspond to the "normal" idling position of the throttle valve. The output from integrator 16 will, however cause the "normal" idling position of the valve to be varied, as in the example of FIG. 1, to control the idling speed of the engine. The effect of the feedback from the transducer 27 is to cause the motor to drive the throttle valve to a position corresponding to the output of integrator 16.

It will be appreciated that the closed loop control of FIG. 2 can also be used (without the computer 28) to drive an idling stop as in FIG. 1 or a separate by-pass valve.

Although the example described above makes use of analogue circuits to perform the invention it will be fully appreciated by those skilled in this art, that digital circuits could be used. In particular, the functions of the amplifier 12, the compensation circuit 14 the amplifier 15, the integrator 16, and the circuit 17 could all be carried out by a microprocessor circuit with a suitably arranged programme.

In the above description control of air flow into the engine is effected to stabilise idling speed. In a conventional carburretor type engine, the fuel flow is, of course, directly related to the air flow, but in the application of the invention to fuel injection type engines it is important to ensure that the sensors used in determining the fuel flow are arranged to detect changes resulting during idling from the operation of the idling speed stabilisation system.

Figure 3:
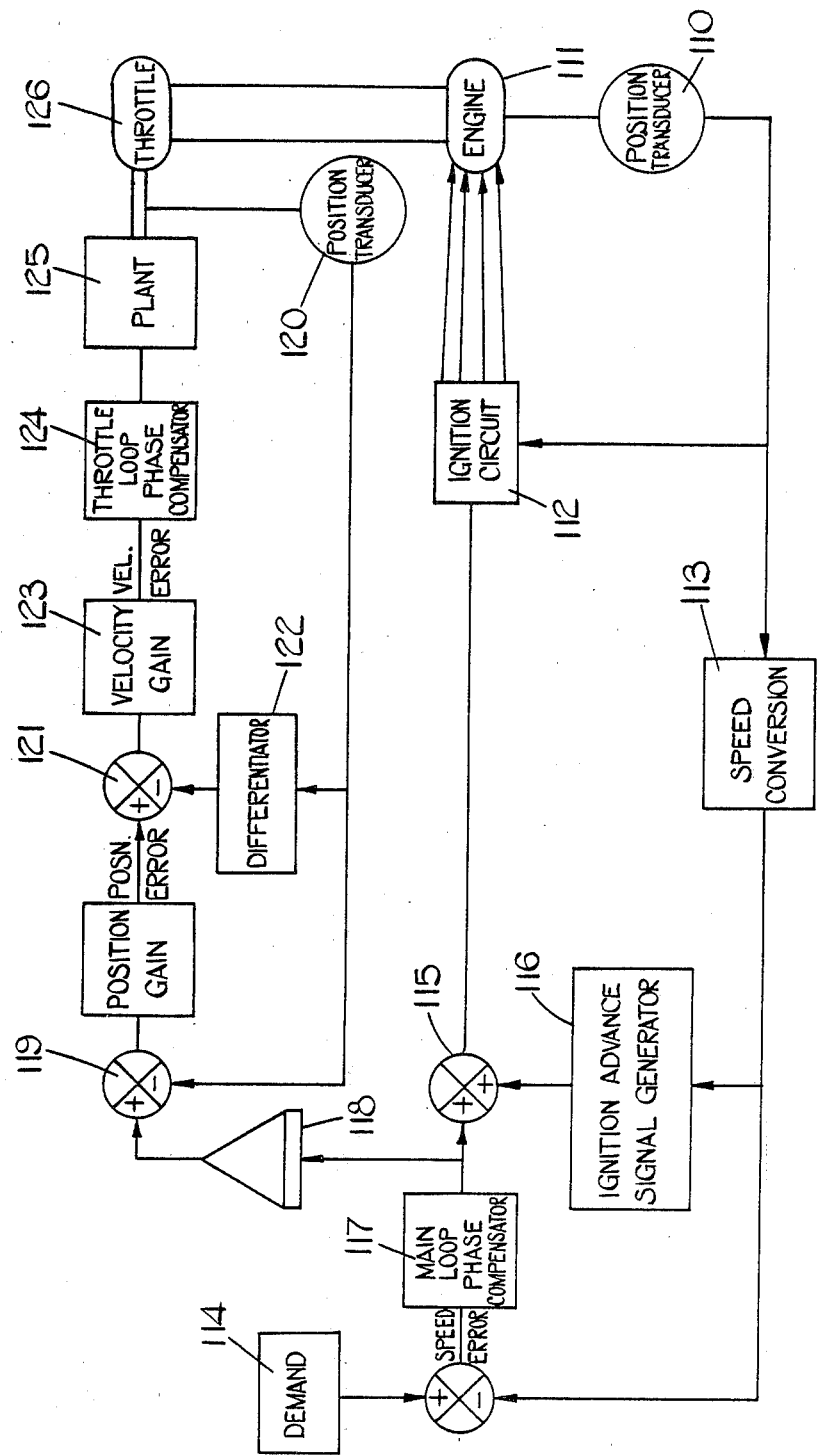
FIG. 3 is a functional block diagram of a further example of the invention.

Turning now to FIG. 3, there is shown therein a functional block diagram of another embodiment of the invention in which control is exercised by a microprocessor circuit. FIG. 3 includes some functional blocks which are simulated in the microprocessor but which do not actually exist as separately identifiable hardware.

A position transducer 110 is driven by the engine and provides both position signals for the ignition control 112 and, via a speed conversion block 113, speed signals for the closed loop speed control. These speed signals are used, in conjunction with signals from a speed demand signal generator block 114 to generate a speed error signal which is applied, via a phase compensator block 117 and a summing block 115, where it it summed with a signal from an ignition advance signal generator block 116, to the ignition circuit 112. The output of the phase compensator block is also integrated in an integrator block 118 to provide a throttle position reference signal which is compared in a different generator block 119 with a position feedback signal from a throttle position transducer 120. The position error signal, after suitable gain adjustment is applied to another difference generator block 121 where it is compared with a throttle speed signal from a differentiator block 122 operating on the output of the throttle position transducer 120. There is thus produced a velocity error signal which after suitable gain adjustment 123 and phase compensation 124 is applied to a throttle servo 125 controlling the throttle 126.

Figure 4:
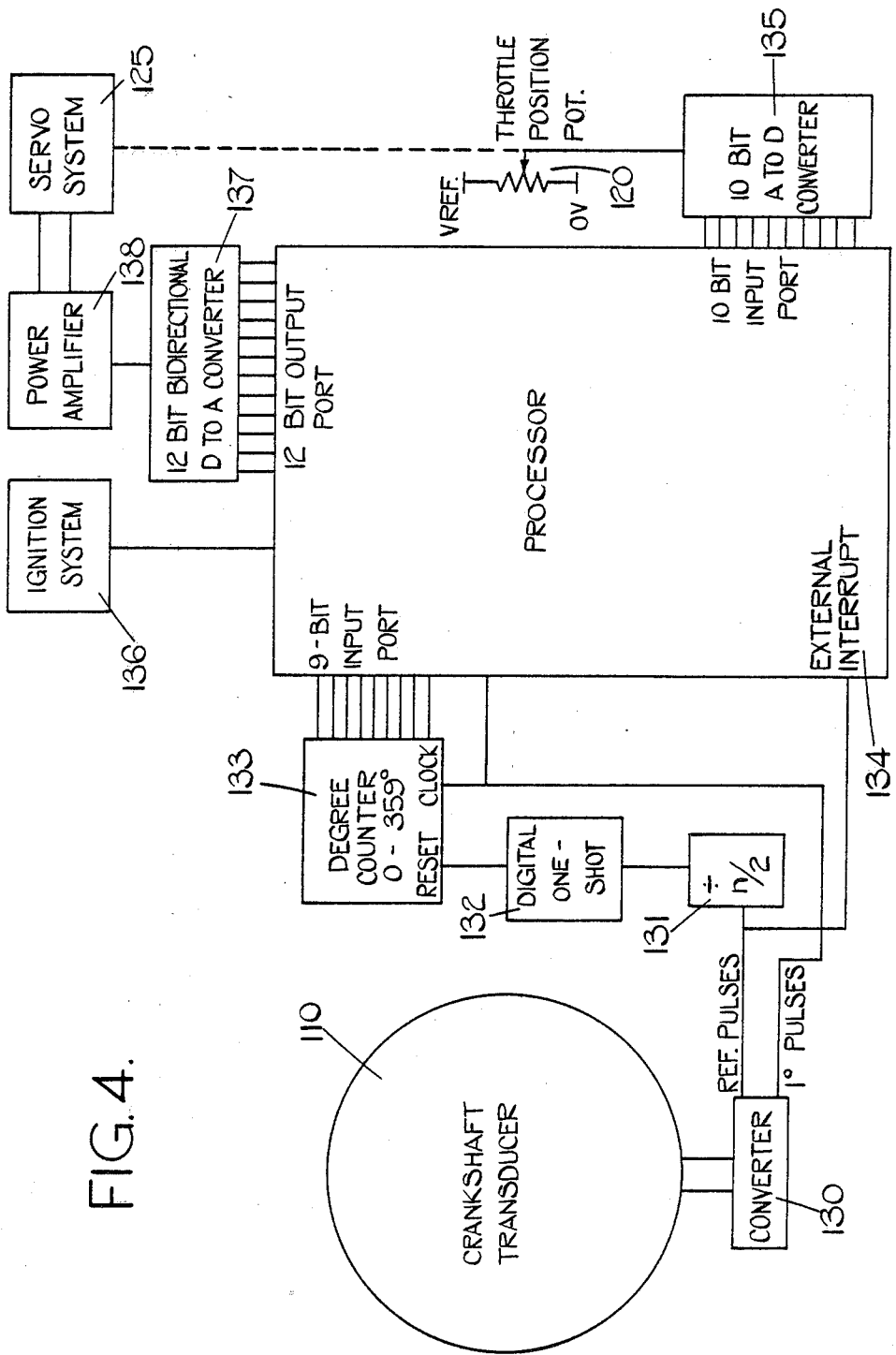
FIG. 4 is a diagram showing part of the hardware used in the example of FIG. 3.

FIG. 4 shows the actual microprocessor and associated hardware, including the engine position transducer 110 which is of known type associated with a converter circuit 130 which produces reference pulses twice per engine revolution as well as 1° marker pulses. The reference pulses are applied to a divide by 2 circuit 131 and thence to a digital one-shot circuit 132, the output of which is applied to the RESET input of a counter 133 which receives the 1° marker pulses at its CLOCK input. The 9-bit digital output of the counter 133 thus represents the instantaneous position of the engine crankshaft, within each revolution thereof. This 9-bit output and the 1° pulses are applied to inputs of the microprocessor 134. Furthermore, the reference pulses are applied to an EXTERNAL INTERRUPT input of the microprocessor.

Another 10-bit input port of the microprocessor is connected to the outputs of an analog-to-digital converter 135 which receives as input, the signal from a throttle potentiometer which is the position transducer 120 of FIG. 3. One output terminal of the microprocessor is connected to the ignition system 130 which is such that the ignition coil current is turned on when the signal at this terminal goes high and off when the signal goes low. Ignition circuits of this type are common place and no specific description is thus required. A 12-bit bidirectional digital-to-analog converter 137 is connected to a 12-bit output port of the microprocessor 134 and provides an analog signal to a power amplifier 138 which drives the servomotor 125.

Figure 5:
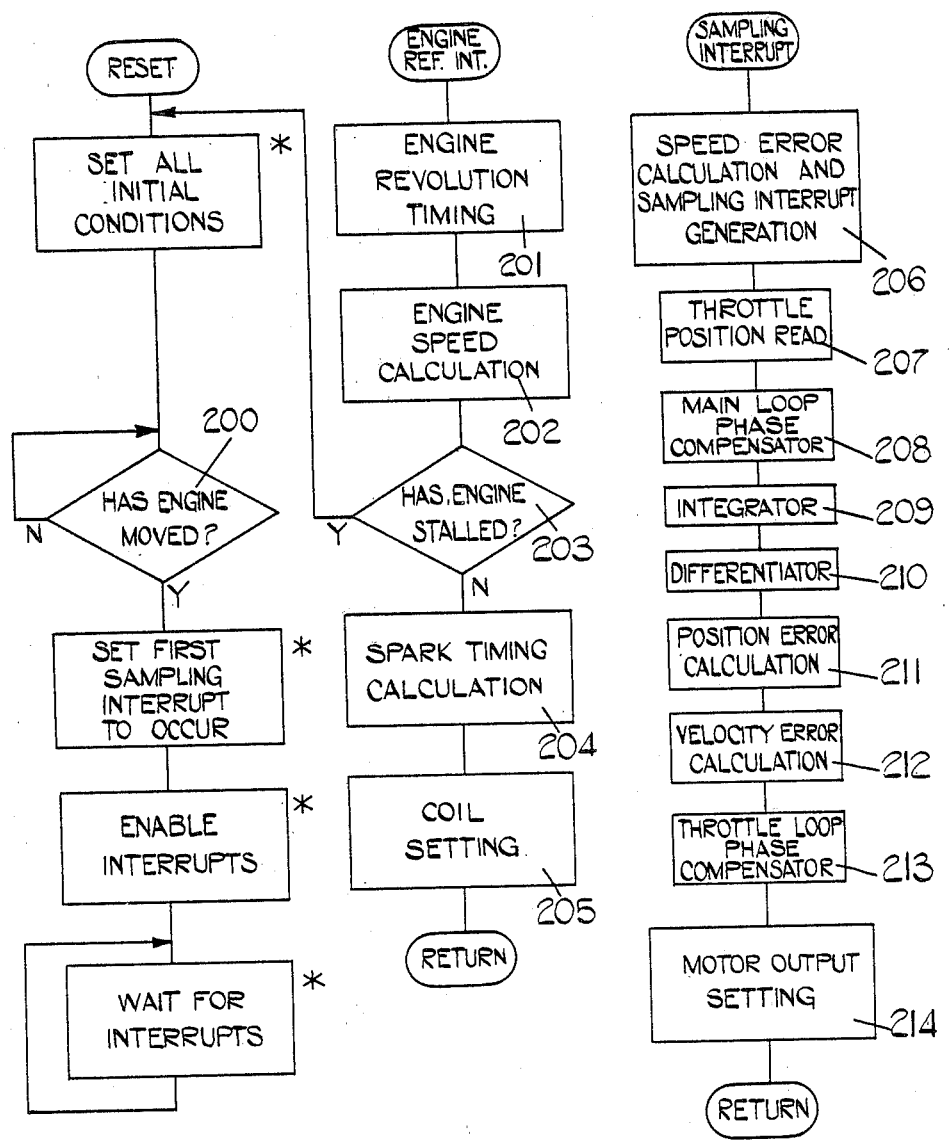
FIG. 5 is a general flow chart of the programme used by the hardware of FIG. 4, and FIGS. 6 to 19 are detailed flow charts of different parts of the programme illustrated in FIG. 5.

Turning now to FIG. 5, it will be seen that the programme used by the microprocessor incorporates a main loop, an external interrupt routine and an internal interrupt routine. The main loop is concerned with initialisation of the microprocessor and is shown at the left hand side of FIG. 5. No further detail of this loop is given as it is self-explanatory except for the step 200 of determining if engine revolution is occurring. This is expanded in FIG. 6.

The external interrupt routine includes, firstly an engine revolution timing subroutine 201 which is expanded in FIG. 7. This is followed by a speed calculation routine 202 expanded in FIG. 8. Thereafter, a decision 203 is made as to whether or not the engine has stalled. If so, i.e. if speed=0 the programme returns to the initialisation routine. If the engine is still running, i.e. speed >0 a spark timing calculation 204 is carried out. This is expanded in FIG. 9. Finally, as shown expanded in FIG. 10, a coil setting sub-routine 205 is carried out, after which the programme returns to the main "wait for interrupts" loop.

Figures 11, 12:
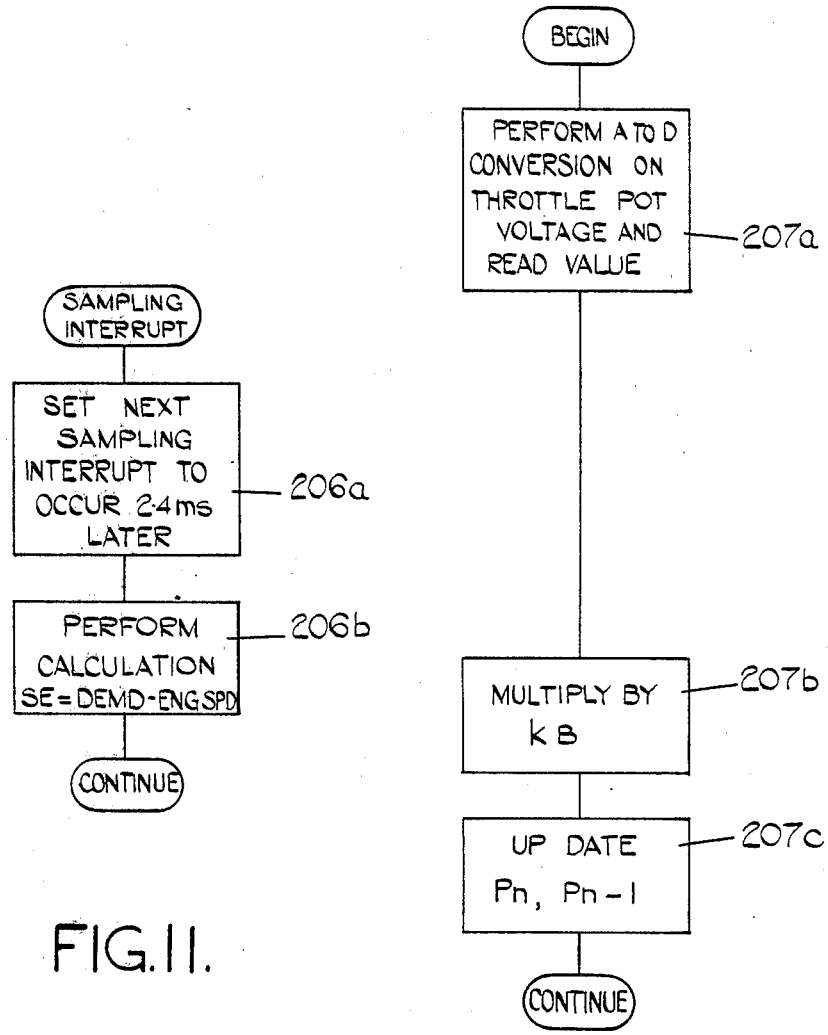
Figure 13:
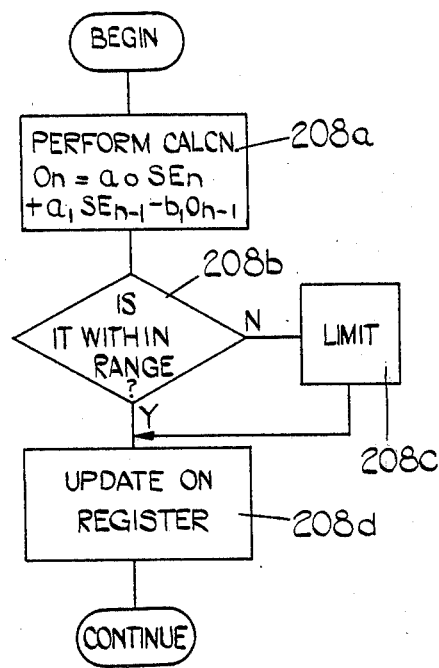
Figure 15:
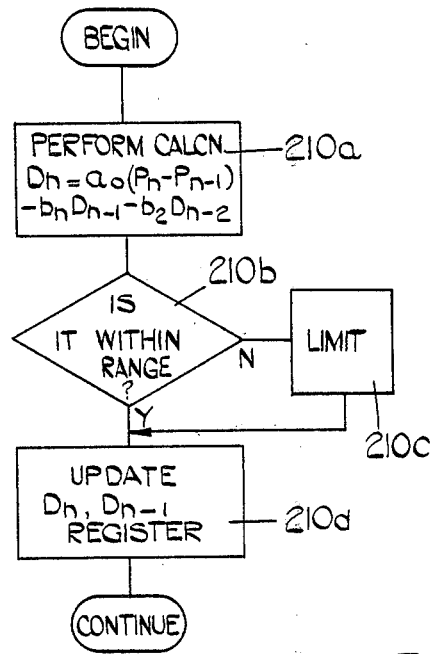
Figure 14:
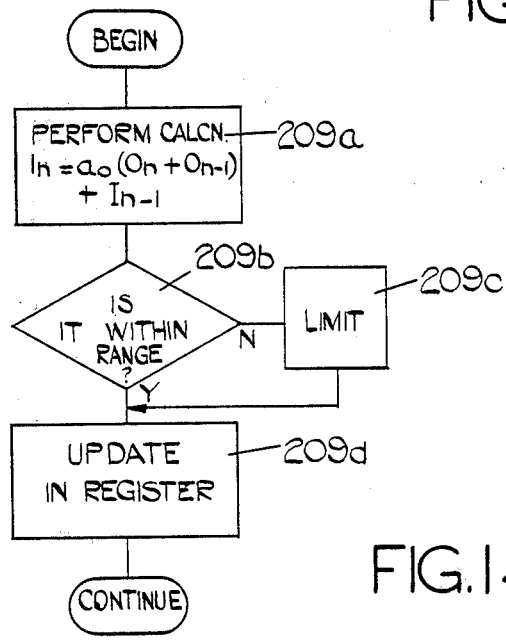
Figure 16:
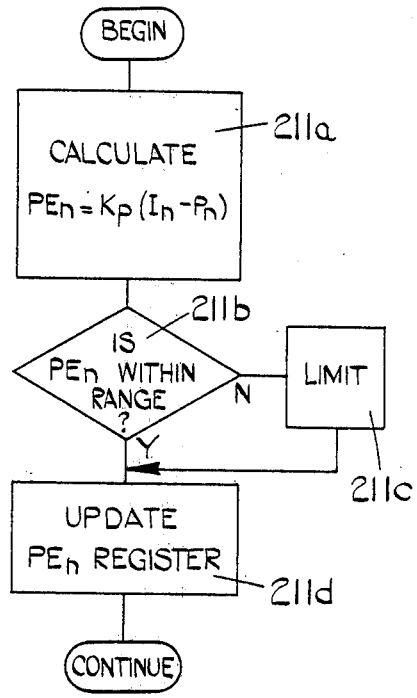
Figure 17:
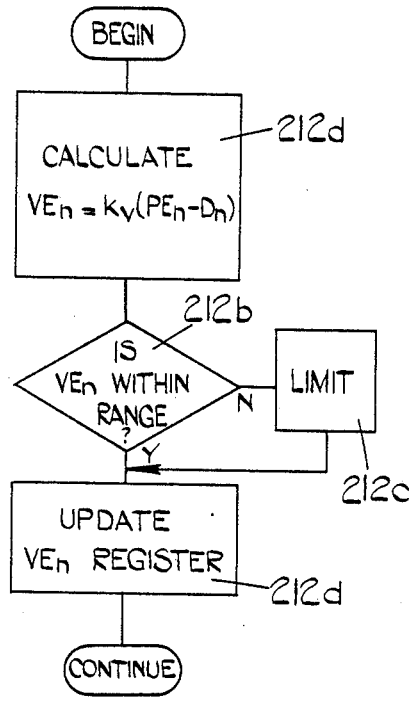
Figure 18:
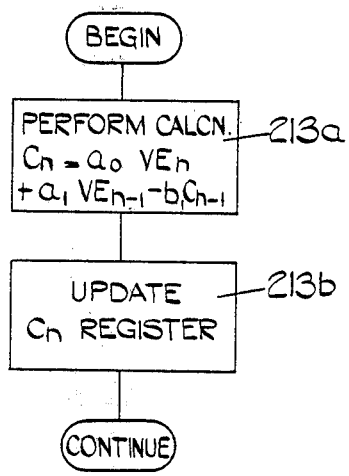
Figure 19:
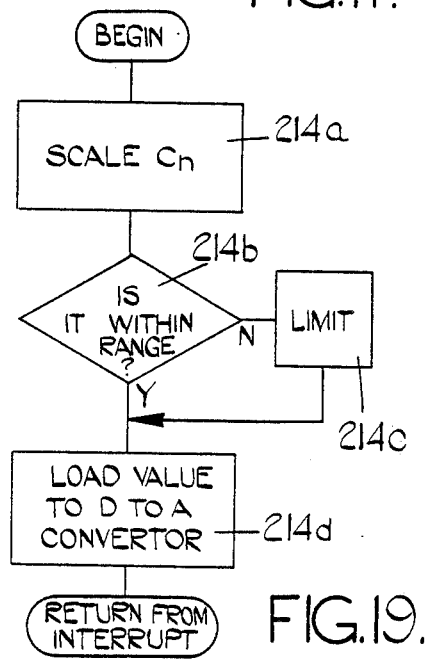

The internal interrupt routine controls throttle adjustment and includes a speed error calculation and sampling interrupt generation sub-routine 206 shown in detail in FIG. 11. A throttle position read sub-routine 207 expanded in FIG. 12 follows and this is followed by a main loop phase compensation sub-routine 208 shown in FIG. 13. An integration routine 209 (FIG. 14) follows and is followed in turn by a differentiation sub-routine 210 (FIG. 15). A position error calculation sub-routine 211 (FIG. 16) and a velocity error calculation sub-routine 212 (FIG. 17) are then executed, followed by a throttle loop phase compensation sub-routine 213 (FIG. 18). Finally a motor output setting routine 214 (FIG. 19) is executed before returning to the "wait for interrupts" loop of the main programme.

Returning now to FIG. 6, the engine movement decision 200 comprises a step 200a in which the value held in counter 133 is loaded into a register in the microprocession. A decision step 200b is then made which involves comparing the previously loaded value with the newly loaded one. If the count value has increased the programme continues, but if no increase is found this step is repeated until an increase does occur.

FIG. 7 shows the engine revolution timing step 201 in more detail and includes a step 201a in which the content of a constantly running timing counter included in the microprocessor circuitry is read into a TIM register, thereby recording a measure of the time which has elapsed since the previous crankshaft transducer generated interrupt signal.

Engine speed calculation sub-routine 202 and the "has engine stalled?" decision 203 are shown in FIG. 8. Engine speed calculation is carried out by calculating ENGSPD=30÷TIM where ENGSPD is the engine speed in revolutions per minute and TIM is the contents of the TIM register referred to above. The decision step 203 involves determining whether ENGSPD is less than 45. If so, return to the initialisation stage of the main programme takes place; otherwise the interrupt routine continues with the spark timing calculation 204 (FIG. 9).

In FIG. 9 the first step 204a is a decision as to whether ENGSPD is less than MINIDL which is a preset speed value above which the engine is assumed to be running and below which cranking is assumed to be taking place. If ENGSPD is less than MINIDL a register named RUNADV is cleared so that static ignition timing is selected (see step 204b). If ENGSPD is not less than MINIDL, the RUNADV register is loaded at step 204c with IDLCON, the optimum ignition advance angle for idling from the microprocessor ROM. The next step 204d is to add to RUNADV a value $O_n$ which is the output, to be described later, of the main phase compensation generator sub-routine stored in an appropriate register. The contents of RUNADV register is now inspected in step 204e to decide whether RUNADV is within the permitted range of advance angles. If not a limit figure is applied in a step 204f. The next step 204g is to load a register entitled SPARK with a number "STATIC" which is the number of degrees between the present crankshaft position and the next static timing position, which is stored in the ROM. In step 204h a decision is made as to whether the present contents of the degree counter 133 is more than 180. If so, step 204i is taken which involves adding 180 to the contents of SPARK, before proceeding to step 204j. If not step 204j follows immediately. Step 204j consists of subtracting RUNADV from SPARK so that SPARK is left containing the number of degrees before the next spark.

In FIG. 10, the first step 205a consists of setting a coil off counter to the value of SPARK. Then, in step 205b, 180 is added to SPARK and, in step 205c, a constant value representing the angle for which coil conduction is required, is subtracted from SPARK to give an indication of the crankshaft position at which coil conduction must commence. Next, in step 205d a decision is made as to whether this value is more than 360. If so, 360 is subtracted in a step 205e before proceeding to step 205f, otherwise the programme proceeds directly to step 205f which involves setting a coil on time counter (of which there may be two in the microprocessor circuitry to allow for overlapping operation) to the calculated value.

In FIG. 11, the first step 206 of the internal interrupt routine is shown. This consists of resetting the sampling interrupt timer of the microprocessor circuitry to start another internal interrupt sequence in 2.4 mS (step 206a). Then, in step 206b, a calculation of the speed error SE is carried out. This involves subtracting from DEMD, the constant idle speed demand stored in the ROM, ENGSPD, which was calculated in step 202.

Next, in sub-routine 207, the throttle position is loaded, in three steps. Step 207a is the enabling of operation of the analog-to-digital converter 135 and reading of the output thereof. Step 207b is the multiplication of this output by a suitable scaling factor $K_B$ and step 207c is the up-dating of two registers $P_n$ and $P_{n-1}$ which store the latest sample throttle position $P_n$ and the previous sample throttle position $P_{n-1}$.

Sub-routine 208 comprises a calculation step $$O_n = a_0 SE_n + a_1 SE_{n-1} - b_1 O_{n-1}$$

where $O_n$ is the current phase compensator output, $O_{n-1}$ is the previous output, $SE_n$ and $SE_{n-1}$ are the current and previous speed error values and $a_0$, $a_1$ and $b_1$ are constants (specifically in a particular case $$a_0 = 1.970724$$
$$a_1 = -1.912171$$

and $$b_1 = -0.74359 \text{ (for 2.4 mS sampling)}$$

Next, step 208b is a decision as to whether $O_n$ is within a preset range. If not, a limit is applied in step 208c, before continuing to step 208d. Step 208d consists of up-dating the $O_n$ register.

In the integration sub-routine 209 the first step 209a is the calculation $$I_n = a_0(O_n + O_{n-1}) + I_{n-1}$$

where $I_n$ and $I_{n-1}$ are the values of the integrator output currently and previous and $a_0$ is a constant (specifically $a_0 = 80.4636 \times 10^{-6}$). Step 207b is a decision as to whether $I_n$ is within a predetermined range. If not a limit is substituted in step 209c. Step 209d is the up-dating of the $I_n$ register.

The differentiating routine 210 starts with a calculation:

$$D_n = a_0(P_n - P_{n-1}) - b_1 D_{n-1} - b_2 D_{n-2}$$

where $D_{n-2}$, $D_{n-1}$ and $D_n$ are the differentiator outputs at three successive sampling times and $a_0$, $b_1$ and $b_2$ are constants (specifically $$a_0 = 17.4292$$
$$b_1 = 0.101961$$
$$b_2 = -0.26536)$$

Again, there is a "within range" decision 210b, a "limit" step 210c and an "up-date" step 210d in which the $D_n$ and $D_{n-1}$ registers are up-dated.

The position error calculation sub-routine 211 starts with a calculation step 211a in which the position error $PE_n$ is calculated by subtracting the throttle position $P_n$ from the integrator output $I_n$ and multiplying by a constant $K_p$ (the position gain). Next the resulting error $PE_n$ is inspected in step 211b to determine whether it is within a prescribed range. If not, a limit is applied in a step 211c. Step 211d consists of up-dating the $PE_n$ register.

Routine 212 consists of similar steps 212a, 212b, 212c and 212d, leading to calculation of the velocity error $VE_n$, limitation of this if necessary and up-dating of the $VE_n$ register.

The throttle loop phase compensation sub-routine consists of calculating (step 213a)

$$C_n = a_0 VE_n + a_1 VE_{n-1} - b_1 C_{n-1}$$

where $C_n$ and $C_{n-1}$ are the current and previous values of the throttle loop phase compensation output and $a_0$, $a_1$ and $b_1$ are constants (specifically $a_0 = 4.41453$ $a_1 = -4.1594$ and $b_1 = 0.74359$) step 213b consists of up-dating the $C_n$ register.

Finally routine 214 comprises multiplying $C_n$ by a scaling factor (step 214a), deciding (step 214b) whether the scaled $C_n$ value is within permitted limits, limiting the value if need be, and loading the value into the digital-to-analog converter 137. The programme then returns to the "wait for interrupts" loop of the main programme.

It will be appreciated by those skilled in the art that the above programme enables the ignition timing to be adjusted at each ignition occurrence, in accordance with the most recent speed error value, whereas the throttle angle is changed relatively slowly in accordance with the integral of the speed error. The inclusion of the throttle speed control within the throttle control loop ensures stability of operation.

I claim:

1. A method of controlling the idling speed of an internal combustion engine which comprises generating a signal representing the error between the actual engine speed and a desired idling speed, controlling the ignition timing of the engine directly in accordance with the error signal in a manner to cause the engine speed to approach the desired idling speed and controlling the admission of air or air/fuel mixture to the engine in accordance with the time integral of the error signal in a manner to cause the engine speed to approach the desired idling speed.

2. A method as claimed in claim 1 in which the engine speed error is derived by subtracting a signal representing actual engine speed from a signal representing desired engine speed and applying a phase compensation operation to the difference.

3. A method as claimed in claim 2 in which closed loop control of the throttle position is carried out in accordance with the integral of the speed error signal.

4. An internal combustion engine closed loop idling speed control system comprising circuit means for generating an electrical signal representing the error between the engine speed and a desired idling speed, ignition timing control means connected to be controlled by said error signal so as to vary the engine ignition timing in accordance with said error signal and air admission control means connected to be controlled in accordance with the time integral of the error signal for controlling air flow into the engine air intake manifold.

5. A system as claimed in claim 4 including a closed loop control of the throttle position having the integrator output as its demand input.

* * * * *